Nov. 11, 1947.   C. J. NEUMAN   2,430,730
DETACHABLE PIPE JOINT
Filed May 12, 1944
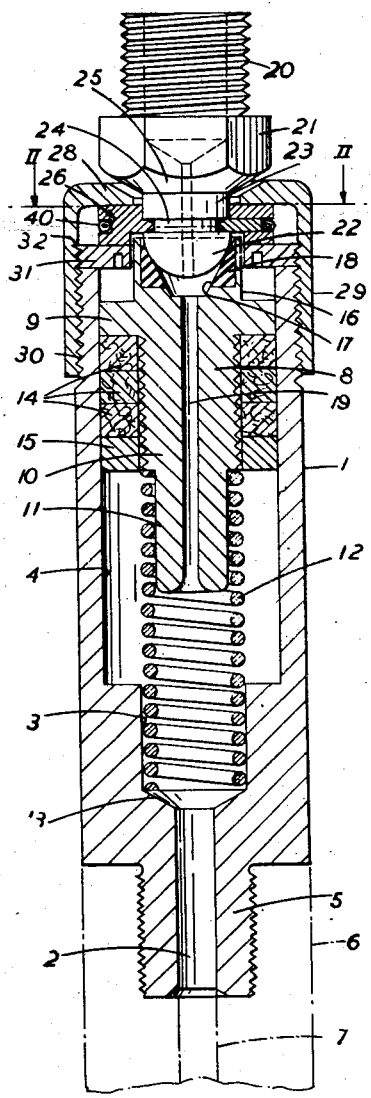
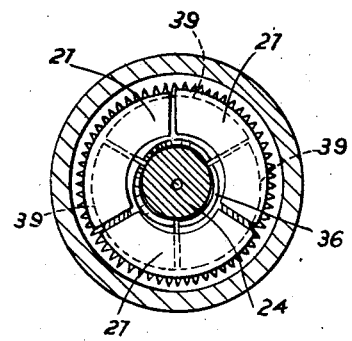
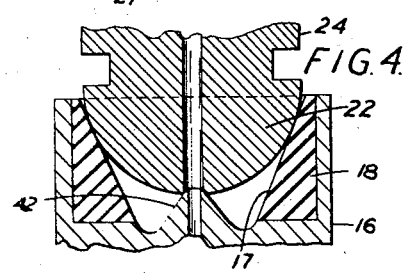
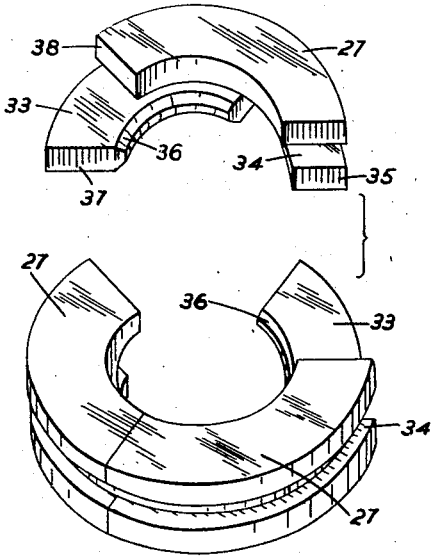
Inventor
CHAIM JAKOB NEUMAN
Attorneys Patented Nov. 11, 1947

2,430,730

UNITED STATES PATENT OFFICE 2,430,730

DETACHABLE PIPE JOINT

Chaim Jakob Neuman, London, England

Application May 12, 1944, Serial No. 535,302
In Great Britain May 12, 1943

7 Claims. (Cl. 285—169)

This invention concerns means for effecting a temporary coupling between fluid conducting members, e. g., fluid delivery means and fluid receiving means. The invention is particularly suitable for application to means for coupling high pressure greasing and oiling apparatus to apparatus to be greased. For example, the invention may be applied to nozzles for greasing apparatus such, for instance, as grease guns and automatic greasing and oiling machines, and grease nipples, oilers and similar lubricating devices for use therewith. The invention is not, however, restricted in its application to greasing or oiling apparatus and may be used in any case where it is desired to effect a temporary coupling between two fluid conductors.

The kind of coupling to which the invention relates comprises a tubular female coupling member (e. g., a nozzle for a grease gun or a greasing machine) through which a flowable substance, e. g., grease or oil, may be fed to a passage provided male coupling member (e. g., a grease nipple oiler, or similar device) provided with means, e. g., peripherally disposed shoulder means, with which retaining jaws carried by, and movable relative to, the said female coupling member are adapted to engage to anchor the male coupling member to the female coupling member.

One object of the invention is to provide means whereby a fluid-tight joint may be made and unmade simply and rapidly between the male and female coupling members, e. g., between the nozzle of greasing apparatus, for instance, a grease gun, and a grease receiving nipple, in such a way as to avoid or reduce the customary loss of fluid and the consequent soiling of the apparatus, i. e., both the dispensing apparatus and the fluid receiving object or apparatus.

A further object of the invention is to provide a generally improved means of effecting a temporary fluid-tight coupling between two fluid channels or passages.

A further object of the invention is to arrange for the male and female coupling members to be coupled together by a simple relative co-axial movement, and for the coupling members to be uncoupled by a "breaking" action, e. g., by moving the one coupling member angularly relatively to, and simultaneously away from, the other coupling member as distinct from drawing the two coupling members apart along their common axis. In order to attain this end it is necessary to use a male coupling member which is axially short from the hereinbefore mentioned means for engagement with the retaining jaws, e. g., the peripherally arranged shoulder means, to that extremity of the male coupling member which engages in the female coupling member; there can, therefore, be no relatively long portion of the male coupling member which can be introduced into the female coupling member and be embraced by a resilient sealing ring within the latter to obtain a fluid-tight joint; it is, therefore, necessary to provide other means for effecting the desired fluid-tight joint between the male and female coupling members.

According to one aspect of this invention there is provided in a coupling of the kind referred to, a female coupling member comprising a tubular body, a plurality of retaining jaws carried by said body adjacent one end thereof and adapted to engage an inserted male coupling member to anchor the latter to the female coupling member, a piston slidable axially within said body and peripherally making a fluid-tight joint with the latter, a seat provided on the said piston and adapted to make a fluid-tight joint with the said male coupling member when the latter is inserted into the female coupling member, means yieldingly urging said piston towards the male coupling member receiving end of said female coupling member, and said piston having passage means adapted to convey fluid through the piston to said seat from the end of the piston remote from the seat.

According to a further feature of the invention the said retaining jaws are movable transversely of the axis of said body, but are restrained against movement in the direction of such axis, and means are provided to urge said jaws inwardly.

According to a further feature of the invention the said male coupling member has a part-spherical, e. g., hemi-spherical, tip, and the said seat is in the form of a conical recess adapted to receive said part-spherical tip of the piston. The seat may be provided with a non-metal, e. g., fibre or hard rubber, lining if desired.

According to a further feature of the invention the said coupling member is peripherally recessed adjacent the said part spherical tip to provide shoulder means for engagement by the said retaining jaws. The said peripheral recessing of the male coupling member may comprise a single circumferential groove.

According to a still further feature of the invention the piston is made to serve to centralize the retaining jaws with respect to the body of the female coupling member preparatory to the insertion of the male coupling member.

According to a still further feature of the invention the said retaining jaws may comprise a plurality of annular segments preferably constituting together a flat interrupted ring, the various segments being capable of sliding independently of one another transversely with respect to the axis of the female coupling member and interengaging one another so as to be mutually guiding and so as to prevent relative axial movement of the segments.

According to a further aspect of this invention there is provided a female coupling member comprising a tubular body adapted at one end for connection to a fluid supply source and at the other end for interengagement with the male coupling member, a plurality of male-coupling-member-retaining jaws, said jaws each being in the form of annular segments and all being guidedly mounted in said body, around its axis and adjacent the male coupling-member-receiving end thereof, for sliding movement towards and away from the axis of said body, and said jaws being interengaged with one another to prevent them moving relatively to one another in the direction of the axis of said body, but so as to permit the jaws to move independently inwardly and outwardly, and elastic means to urge said jaws inwardly.

According to a further feature of the invention the said interengaged segments are peripherally grooved and means, such for instance as an elastic member, e. g., a helically coiled tension spring having its ends anchored together so as to be in ring form, is arranged in this groove and around the segments so as to urge these inwardly. If said inwardly urging means for the said segments comprises a helically coiled spring, this spring is preferably of oval shape in cross-section since in the case of a small female coupling member, e. g., the nozzle for a hand operated grease gun, the axial space available for the spring is limited, whereas more space is available transversely and the major axis of the oval-cross-section spring can be disposed axially. By this means a stronger spring may be used than would be the case if a spring of circular cross-section were employed.

In order that the invention may be more readily understood one embodiment of the same will now be described with reference to the accompanying drawings which illustrate the invention applied to the nozzle of a hand operated grease gun and a nipple for use therewith, and in which drawings:

Figure 1 is a part longitudinal sectional view of a grease gun nozzle and the grease nipple co-axially engaged therewith;

Figure 2 is a section on line II—II Figure 1;

Figure 3 is an exploded perspective view showing the construction of the retaining jaws of the nozzle illustrated in Figures 1 and 2; and Figure 4 is a fragmentary longitudinal sectional view showing a modified construction of a part of the apparatus shown in Figures 1 and 2.

The drawings illustrate the invention applied to a female coupling member in the form of a nozzle for a grease gun and a male coupling member in the form of a nipple for mounting upon the object to be greased and adapted for co-operation with the nozzle. The nozzle comprises a tubular body 1 having an axial bore extending from end to end. This bore is in three parts 2, 3 and 4 arranged co-axially in series, these three parts being of different diameters and arranged in increasing steps with the smallest bore at the grease gun end of the nozzle (the lower end in the drawing) and the largest bore at the other end of the nozzle.

The grease gun end of the nozzle is provided in the instance illustrated with a screw threaded male spigot 5 for screw threaded engagement within the discharge tube 6 (indicated in dot and dash lines) of the grease gun proper, and the bore 2 of the smallest diameter in the body of the nozzle is disposed in co-axial alignment with the discharge bore 7 of the grease gun discharge tube 6 when the nozzle is applied to the grease gun.

The portion of the tubular body 1 having the bore 4 of largest diameter acts as a cylinder in which is axially slidably mounted a piston which is indicated generally by the reference 8. This piston comprises a disc 9 which is a close sliding fit in the bore 4 and is provided with an externally screw threaded co-axial boss 10 having a co-axial spring locating spigot 11 around which one end of a helical compression spring 12 is engaged, the other end of this spring seating on the shoulder 13 between the bore portions 2 and 3 of the tubular body of the nozzle. The spring 12 is co-axial with the tubular body 1 and the piston 8.

Upon the boss 10 of the piston are mounted a number (3 in the example shown) of leather or other suitable packing washers 14 which make a close grease-tight but sliding seal with the wall of the bore 4. All these washers 14 are secured in position by means of an internally screw threaded clamping collar 15 screwed on to the opposite end of the boss 10 to that at which the disc 9 is situated.

On the nipple end of the disc 9 the piston 8 is provided with a cylindrical boss 16 projecting therefrom co-axial therewith, this boss being provided with a frusto-conical recess forming a seat 17 for the tip of the nipple subsequently to be described. This seat is preferably provided with a nonmetallic lining 18 which may be formed, for example, of fibre or hard rubber.

The piston 8 is provided with an axial passage 19 extending from end to end thereof so as to place the frusto-conical seat 17 in communication with the bore 2 of the tubular body. Thus the passage 19 serves for the flow of fluid through the piston from the space within the body 1 on the grease gun side of the piston 8 to the seat 17.

The nipple illustrated comprises a screw threaded body 20 having a hexagonal portion 21 by which it may be rotated with the aid of a spanner or the like, such nipple being provided with a part-spherical portion 22 joined to the part 21 by a cylindrical neck or shank 23 provided with a circumferential groove 24 adjacent the inner end of the part-spherical portion 22.

When the nozzle is engaged with the nipple by moving them first into co-axial alignment and then towards one another along the common axis, the part-spherical portion 22 of the nipple comes into engagement with the frusto-conical seating 17 of the piston 8 of the nozzle and depresses this somewhat against the action of the spring 12 which presses the seating into grease-tight engagement with the portion 22 of the nipple.

The nipple is provided with an axial bore which, when the nipple is engaged with the seating 17, is placed in direct communication with the axial passage 19 of the piston.

In order to hold the nipple in the nozzle in the above mentioned grease-tight engagement with the seat 17 of the piston 8 of the nozzle during the greasing operation, the nozzle is provided with a chuck generally indicated by the reference 26, the retaining jaws of this chuck being adapted to engage in the circumferential groove 24 of the nipple to restrain the nipple against axial movement relative to the nozzle. When the nipple is so interengaged with the chuck the centre of curvature of the part-spherical portion 22 of the nipple lies in or adjacent the plane of the jaws of the chuck.

The chuck 26 comprises a plurality of, in the example shown three, radially movable similar retaining jaws, generally indicated by the reference 27, carried at the nipple end of the body 1 and urged inwardly by spring means, such jaws being restrained against axial movement relatively to the body of the nozzle and adapted to engage at their inner edges in the said circumferential groove 24 of the nipple.

The jaws 27 are disposed between an inturned annular flange 28 surrounding the nipple receiving orifice of a cap 29 screwed upon the screw threaded end 30 of the body 1 of the nozzle, and a rigid retaining ring 31 screwed into the cap 29 into engagement with a shoulder 32 provided in the cap and serving to limit the extent to which the ring 31 may be screwed into the latter. The jaws 27 are free to slide transversely at the axis of the body 1 of the nozzle, but are restrained by the flange 28 and the ring 31 from movement in the direction of the axis of such body.

The jaws of the chuck each comprise a sector or segment of an annulus and will hereinafter be referred to as being "annular segmental jaws" or merely "segmental jaws" and the several jaws together constitute an interrupted ring, as is clearly seen from Figure 3. The several segmental jaws are capable of sliding independently of one another radially and transversely with respect to the axis of the nozzle and each jaw is provided, as shown clearly in Figure 3, with a main or retaining part 33 in the form of a sector of an annulus, this retaining part being adapted to engage in a recess 34 provided for its reception in the adjacent jaw. Each jaw thus, in effect, comprises a pair of identical sectors or segments 35 of a flat ring, these segments 35 being axially spaced apart and disposed one directly over the other, and a somewhat similar sector or segment 33 of smaller internal and external radius than the segments 35, this segment being disposed between the segments 35, 35 and the segment 33 being inset radially and offset angularly with respect to said segments 35, so that the inset and offset segment 33 projects inwardly and endwise beyond the other two segments 25 to form a guiding tongue capable of engaging between the segments 35 of the next retaining jaw. In practice each jaw may be formed in one piece or from three pieces.

It is the segments 33 that actually form the retaining jaws and they have their inner edges chambered at 36, as shown, for engagement in the annular groove of the nipple, the chamfering co-operating with the part-spherical surface of the nipple, as the latter and the nozzle are moved together, to open the jaws to admit the nipple.

The radial ends 37 of the segments 33 are conveniently set at 120° apart and serve as mutual stops to limit the extent to which the jaws may move inwardly. The radial ends 38 of the segments 35 are similarly arranged and serve a similar purpose.

Forming the jaws as above described provides a peripheral groove 39 around the interrupted ring composed of the jaws, and in this ring is arranged a helically wound tension spring 40 having its ends fastened together so that the tendency of the spring is at all times to urge the jaws inwardly. The spring 40 is preferably of an oval shape in cross-section, the major axis of the cross-section being arranged in a plane perpendicular to the axis of the body 1 of the nozzle. Making the spring oval in this manner enables a stronger spring to be employed than would be possible with a spring of circular cross-section where the axial length of the groove 39 is small. Usually there will be more space available in the radial direction than in the axial direction so that the spring can be greater in its radial dimension than in its axial dimension.

The boss 16 of the piston 8 is of an internal diameter slightly less than the internal diameter of the lower segments 35 and fits into the recess 41 constituted by the adjacent segments 35 so as to centralise the retaining jaws 27 with respect to the body 1 of the nozzle when no nipple is engaged therewith. When the nipple is engaged with the seat 17 of the piston the nipple end of the boss 16 should be clear of the segments 33 of the chuck jaws so that the seat 17 is free to make a grease-tight engagement with the part-spherical portion 22 of the nipple.

In the modified arrangement shown in Figure 4 it will be seen that the seat 17 on the piston is provided with a central boss 42 around the passage 19 and that, when the nipple is engaged with the seat 17, this boss seats in the end of the bore of the nipple so that the passage 19 and the bore of the nipple are placed in direct communication and two grease seals are made, one along the peripheral line where the part-spherical portion 22 of the nipple engages the seat 17 and one where the central boss 42 seats in the bore of the nipple.

The operation of the nozzle and nipple is as follows: The nipple is screwed into the apparatus to be greased. This nipple will remain permanently in such apparatus as is customary with other forms of greasing nipple. On desiring to feed grease to the nipple the nozzle, which it is assumed has already been applied to a grease gun, is applied to the nipple by first arranging it coaxially with respect to the latter and then moving it towards the nipple in an axial direction. This causes the part-spherical portion 22 of the nipple to press the jaws 27 of the chuck apart and to permit the said tip of the nipple to engage in the cup-like seat 17 of the piston 8 and to depress this seat and the piston against the action of the spring 12. Thus a grease-tight joint is made between the nipple and the seat 17 which centralises the nozzle with regard to the nipple, and the nipple is automatically engaged and retained in this position by the jaws 27 of the chuck which, after being urged apart by the insertion of the nipple close again and engage in the annular groove 24 in the nipple and behind the shoulder adjacent the part-spherical portion 22 of the nipple. The engagement of the inner flat surfaces of the segments 33 of the jaws 27 with the said shoulder prevent the nipple being pushed by the force of the grease or pulled axially out of the nozzle.

The grease gun is used as usual, the grease leaving the gun and passing axially into the tubular body 1 on the grease gun side of the piston 8. This piston ensures that grease cannot flow past the piston on the outside thereof and that the only way by which the grease can pass to the nipple is via the passage 19 through the piston. Thus the grease passes into the seat 17 and as there is a grease-tight joint between this seat and the nipple, the only way in which the grease can escape from the seat is through the nipple itself.

As the piston ensures that the grease can only pass through the piston itself as distinct from around it, it is ensured that grease will not be able to pass through the chuck and out of the nozzle around the nipple, and therefore the soiling of the nozzle and the nipple and parts associated therewith is avoided.

After the greasing operation has been completed the grease gun is tilted angularly with respect to the axis of the nipple. This causes an outward movement of the jaws 27, or some of them, and enables the grease gun to be disconnected from the nipple, the joint thus being broken by relative tilting and withdrawal of one member with respect to the other.

Although the invention has been described by way of example as applied to a grease gun and grease gun nipple, it is not limited in its application to such apparatus. The coupling could, for instance, be used for connecting two flexible tubes, or for joining a flexible tube to a fixed fitting; indeed the invention has very many possible applications.

What I claim is:

1. For a coupling of the kind referred to, a male coupling member having a seating surface of part-spherical form and having an annular groove immediately behind the part-spherical form, a female coupling member having a tubular body for attachment to the fluid supply source and a fluid outlet adapted to receive the part-spherical portion on said male coupling member, a piston slidable within said body and having a passage therethrough for fluid aligned with a bore through the male coupling member, an annular seat surrounding the delivery end of the passage through said piston, means yieldingly urging said piston towards said fluid outlet to maintain said seat in fluid-tight engagement with the part-spherical form of the male coupling member, a plurality of annular segmental retaining jaws disposed within said body around the axis of the part-spherical portion and engageable in the annular groove to anchor the female coupling member to the male coupling member, said jaws all being mounted in said body and guided for sliding movement in a direction towards and away from the axis of said outlet but restrained from movement transversely to the said direction, and means to urge the said jaws inwardly, the center of curvature of said part-spherical portion lying upon the axis of the latter portion and in a plane including the annular groove so as to enable disengaging the body from the part-spherical portion by a breaking action.

2. Coupling means according to claim 1, wherein the seat on the piston is in the form of a recess adapted to receive and to make a fluid-tight joint with the part-spherical portion and wherein the base of the said recess is provided with an annular centrally disposed boss forming an auxiliary seat adapted to engage and seat in the orifice of the bore of the male coupling member when the latter is engaged with the said seat, whereby two fluid tight seals are made between the male coupling member and the said piston.

3. Coupling means according to claim 1, wherein means are provided on the said piston to centralize the said retaining jaws with respect to the fluid outlet of the female coupling member preparatory to the insertion of the male coupling member in the latter.

4. Coupling means according to claim 1, wherein each of the said retaining jaws is provided with a tongue extending into and interengaging with the adjacent jaw so that gaps between the jaws are bridged and closed.

5. Coupling means according to claim 1, wherein the said tubular body is provided at the male coupling member receiving end thereof with a detachable cap provided with an orifice adapted to receive the male coupling member co-axially and wherein said plurality of male coupling-member-retaining jaws are unitarily mounted in said cap between an annular flange thereof around the said orifice and an internally mounted retaining ring, said jaws being disposed between said flange and ring for sliding movement in a direction towards and away from the axis, but being restrained by said flange and ring against movement in a direction transverse to the said direction.

6. Coupling means according to claim 1, wherein each of said jaws comprises a retaining part in the form of an annular segment and also a pair of axially spaced superposed annular segments rigidly associated with said retaining part and angularly and outwardly offset with respect to the latter so as to provide a guiding recess adapted slidably to receive a portion of the said retaining segment of the adjacent jaw.

7. A coupling of the class described comprising a nipple having a seating surface of part-spherical form immediately behind which the nipple is peripherally recessed or grooved to provide shoulders lying in parallel planes perpendicular to the axis of the nipple, a nozzle for receiving the nipple, gripping jaws in the nozzle having a plurality of segments concentrically arranged with respect to the nipple and slidable radially relative to the nipple axis between the shoulders so as to anchor the nozzle to the nipple when the nozzle and nipple are in alignment, the centre of curvature of said part-spherical seating surface lying upon the axis of the nipple and in or so near to the parallel planes aforesaid to enable disengagement of the nozzle from the nipple by a breaking action.

CHAIM JAKOB NEUMAN.

REFERENCES CITED

The following references are of record in the file of this patent:

UNITED STATES PATENTS

| Number | Name | Date |
|---|---|---|
| 1,534,173 | Fogelberg | Apr. 21, 1925 |
| 1,509,651 | Iftiger | Sept. 23, 1924 |
| 2,047,132 | Williams | July 7, 1936 |
| 1,946,316 | Friend | Feb. 6, 1934 |
| 2,362,880 | Campbell | Nov. 14, 1944 |